United States Patent [19]
Mathis et al.

[11] Patent Number: 5,490,272
[45] Date of Patent: Feb. 6, 1996

[54] METHOD AND APPARATUS FOR CREATING MULTITHREADED TIME SLICES IN A MULTITASKING OPERATING SYSTEM

[75] Inventors: Harry M. Mathis, Flower Mound; Shrikant N. Parikh, Mesquite, both of Tex.

[73] Assignee: International Business Machines Corporation, Armonk, N.Y.

[21] Appl. No.: 188,504

[22] Filed: Jan. 28, 1994

[51] Int. Cl.$^6$ .................................................. G06F 9/46
[52] U.S. Cl. ........................... 395/650; 395/375; 395/737
[58] Field of Search .................................... 395/650, 740, 395/737, 733, 375

[56] References Cited

U.S. PATENT DOCUMENTS

| | | | |
|---|---|---|---|
| 4,445,173 | 4/1984 | Pilat et al. | 395/375 |
| 4,562,538 | 12/1985 | Berenbaum et al. | 395/182.13 |
| 5,008,812 | 4/1991 | Bhandarkar et al. | 395/375 |
| 5,142,677 | 8/1992 | Ehlig et al. | 395/650 |
| 5,291,608 | 3/1994 | Flurry | 395/736 |
| 5,367,676 | 11/1994 | Katori | 395/600 |
| 5,390,329 | 2/1995 | Gaertner et al. | 395/650 |
| 5,421,014 | 5/1995 | Bucher | 395/650 |
| 5,428,779 | 6/1995 | Allegrucci et al. | 395/650 |
| 5,430,841 | 7/1995 | Tannenbaum et al. | 395/164 |
| 5,438,680 | 8/1995 | Sullivan | 395/800 |

OTHER PUBLICATIONS

Drakes et al., "Using Continuations to Implement Thread Management and Communication in Operating Systems", *Operating Systems Review*, vol. 25, No. 5, ACM, pp. 122–136.

Hieb et al., "Continuations and Concurrency", *Proceedings of the Second ACM SIGPLAN Symposium on Principles & Practice of Parallel Programing*, Seattle, Washington, Mar. 14–16, 1990, pp. 128–136.

Dybrig et al., "Engines from Continuations", *Computer Languages*, vol. 14, No. 2, Pergamon, 1989, pp. 109–123.

Francis et al., "Self-scheduling and Execution Threads", *Proceedings of the Second IEEE Symposium on Parallel and Distributed Processing* 1990, Dec. 9–13, 1990, pp. 586–590.

Daniel C. McCrackin, "The Synergistic Effect of Thread Scheduling and Caching in Multithreaded Computers", *Digest of Papers, Compcon Spring '93*, Feb. 22–26, 1993, IEEE, pp. 157–164.

Compcon Spring '93, Feb. 22–26, 1993, IEEE, pp. 157–164.

Leon Alkalaj, "Performance of Multithreaded Execution in a Shared Memory Multiprocessor", Proceedings of the Third IEEE Symposium on Parallel and Distributed Processing, Dec. 2–5, 1991, pp. 330–333.

*Primary Examiner*—William M. Treat
*Attorney, Agent, or Firm*—David A. Mims, Jr.; Edward H. Duffield

[57] ABSTRACT

A method and apparatus for subdividing a thread's processing cycles among a set of threadlets or regions within a thread or process. This is achieved through instructions in the application code which are interpreted by the operating system. The beginning and ending of a threadlet is through the "Begin Threadlet" and "End Threadlet" instructions. A segmented stack is utilized to separately hold that part of the stack belonging to each threadlet. The programmer must know within the application code places where the data contents of the registers do not merit saving or is saved in memory. This provides the user with an opportunity to switch to a different activity without saving registers. The user identifies this to the operating system by a special instruction called "SWITCHIR". The SWITCHIR instruction tells the operating system not to save registers. Therefore, within the same thread, the operating system will keep on executing a threadlet until it encounters this instruction. Upon encountering the SWITCHIR instruction, the operating system will save the program counter and stack pointer in a threadlet control block and execute subsequently encountered threadlets.

14 Claims, 3 Drawing Sheets

Fig. 1

METHOD AND APPARATUS FOR CREATING MULTITHREADED TIME SLICES IN A MULTITASKING OPERATING SYSTEM

FIELD OF THE INVENTION

This invention relates to a data processing system, and more particularly, to a multitasking operating system with multithread capability for providing time slices of varying values for users of real-time processes.

BACKGROUND OF THE INVENTION

A new breed of 32-bit desktop operating systems is evolving. These operating systems have brought to the desktop the concepts of multitasking and multithreading. These operating systems are capable of making a single computer processing unit (CPU) appear as many CPUs in a personal computer (PC). Most 32-bit desktop operating systems accomplish this through time-sliced multitasking or event-driven multitasking.

In its simplest form, time-slicing works by alternately giving small amounts of time, called time-slices, to applications. For example, a user running three programs: a word processor, a database, and a spreadsheet, may run the word processor in the foreground, the database in the background and the spreadsheet in the background. If time-slices are thirty milliseconds long, for the first thirty milliseconds the CPU gives its undivided attention to the word processor. During the first thirty milliseconds, the word processor and spreadsheet get no CPU time. In the second time-slice, the database gets the CPU's attention. While the current multitasking operating systems provide time-slicing, it is far too coarse to adequately support certain applications. For example, some applications require extremely tight coordination among highly time-critical activities. The proper operation of these applications can be achieved by manipulating the priorities of applications to prevent other activities from being time-starved.

In real-time systems, there is often the requirement for very rapid switching among tasks to ensure that highly sensitive, highly time-critical tasks are executed at just the proper moment. Often such systems need to achieve the effect of multitasking with time slices a fraction of the size of the 20 to 35 millisecond time slices provided by current multitasking micro-processing operating systems. For example, in multimedia applications there typically is a need to precisely synchronize data streams to and from several data channels and schedule input and output events to control and provide superior presentation of sound and motion video. The actual tasks may take only a fraction of a time slice to accomplish and may have to be accomplished more frequently then once every time slice in order to maintain the integrity of the presentation, that is, to ensure that the presentation conveys the impression of smooth and continuous motion.

Other real-time systems frequently contain sets of tasks which require strong coordination at critical, but very finely spaced intervals. The execution timing for one or more tasks can not be predicted exactly, and may be non-deterministic because of a requirement to interact with external agents, such as communication channels, input and output devices or storage devices. In current art systems, separate threads would be established for each of the tasks, but because of the fineness of the time intervals required between coordination events, the time slices provided by the operating system will not permit the coordination required. In these cases, the only alternatives are to increase the priority of the threads involved, with the result that the processing of other threads sharing the processor is effectively blocked, or to program the complex application for a system that does not permit multiprocessing.

Consequently, a technique is needed to provide time slices where multiple subprocesses need to be closely synchronized within time intervals much smaller than the time slice.

SUMMARY OF THE INVENTION

This invention provides a method and apparatus for subdividing a thread's processing cycles among a set of threadlets or regions within a thread or process. These threadlets or regions have critical interaction requirements that cannot be met as parts of separate threads or processes because operating system time slicing support cannot be achieved. The threadlets require less overhead than general context switches because the context switches are explicitly restricted to points where minimal context is required to be preserved. This is achieved through instructions in the code which are interpreted by the operating system. A thread containing threadlets will have a threadlet control block. The threadlet control block will identify how many threadlets comprise the thread, the execution strategy to be used, i.e. a round-robin (equality) strategy or most-favored (high-priority) strategy. The operating system will segment the thread's stack based upon information contained in the threadlet control block. The beginning and ending of a threadlet are identified through the "Begin Threadlet" and "End Threadlet" statements. A specialized stack is utilized which is segmented to hold, separately, that part of the stack belonging to each threadlet. The user must know within an application places where the data contents of the registers, following execution of a particular instruction, do not merit saving or that the data contents which would be saved during a thread context switch, already happens to be saved in memory. This provides the user with an opportunity to switch to a different activity without saving registers. The user identifies this to the operating system by a special instruction called "SWITCHIR". The SWITCHIR instruction tells the operating system not to save registers. Within the same thread, the operating system will keep on executing a threadlet until it encounters this instruction. Upon encountering the SWITCHIR instruction, the operating system will save the program counter and stack pointer in a threadlet control block. The operating system will switch to the program counter and stack pointer of the stack segment for the next threadlet or their last values and start executing with that program counter. The operating system will execute the code for each threadlet in round-robin fashion, switching to the next threadlet as it reaches a "SWITCHIR" or an "END THREADLET" instruction, but performing regular thread or process switching when the thread's time slice has expired or an interrupt occurs.

DETAIL DESCRIPTION

Figure 1:
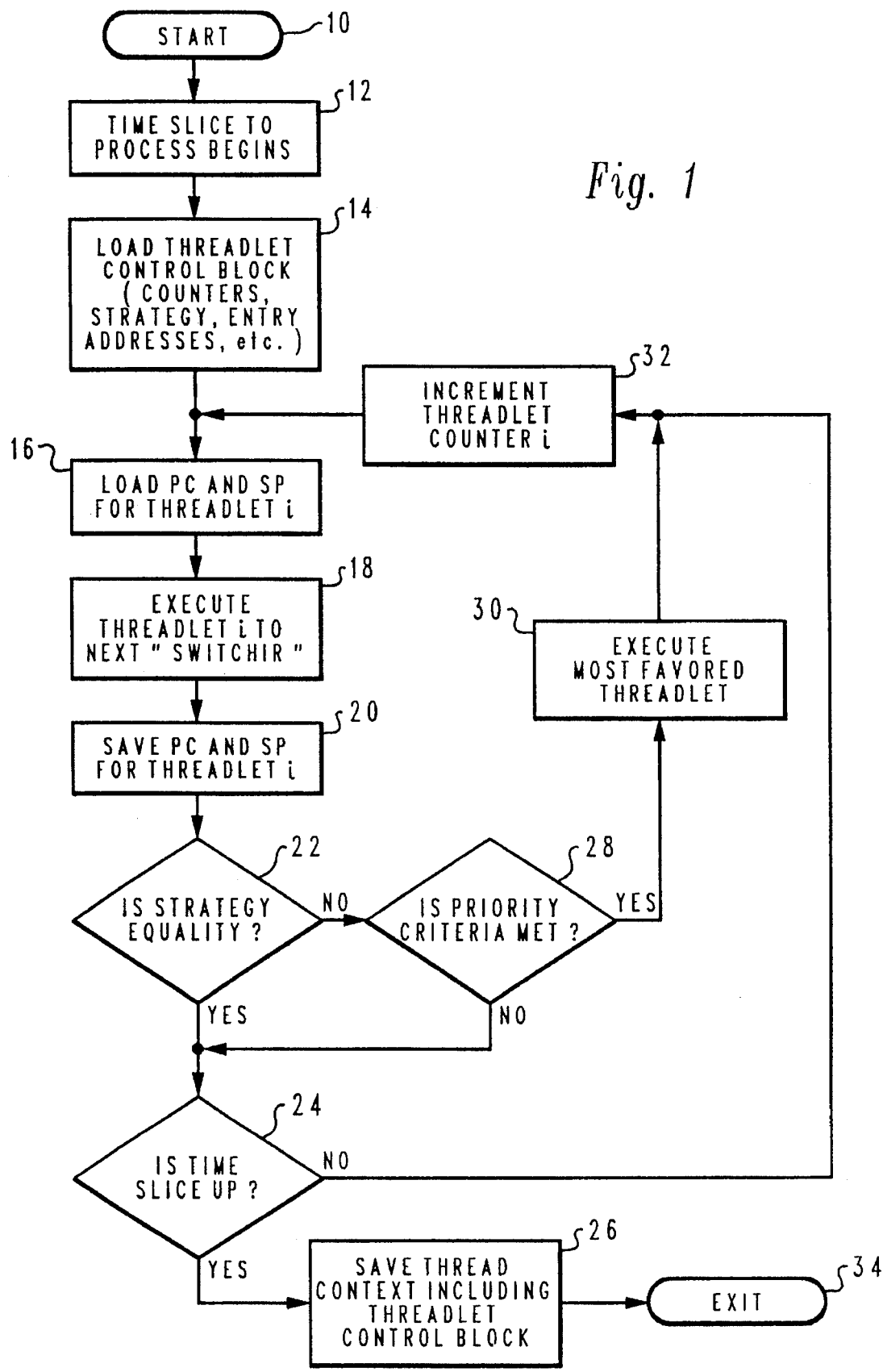
FIG. 1 depicts a flow diagram of the invention for processing threadlets.

This invention achieves the effect of multithreaded, multitasking with very small times slices. The time slices are as small as desired by users of real-time systems. For the purpose of this invention, a real-time system is defined as a system that processes data in a rapid fashion so that the results are available in time to influence the process being monitored or controlled. This invention supports time slices on the order of 100 microseconds or less without the overhead of full fledged thread switching. For the purpose of this invention, a thread is a part of a program that runs on its own, independently from the other parts. For example, a spreadsheet might create a thread when a user tells it to save a file. The thread runs like a program in the background, so the user can continue entering numbers in the spreadsheet without waiting for the file to be saved. This invention builds upon the user's knowledge of the design of an application to allow greater control of the underlying operating environment.

In the 32-bit Operating System/2 2.X product (e.g., manufactured by the IBM Corporation), the user specifies the upper and lower limits on the amount of time the computer spends on each thread with a TIMESLICE command. The syntax for the command is "TIMESLICE min,max" where "min" is a number between 32 and 65536. When a thread gets the computer's attention, it will keep it for at least "min" thousandths of a second. The "max" portion of the command may be a number between 32 and 65535. When a thread gets the computer's attention, it will keep it for no longer than "max" thousandths of a second.

If multithreading and time slicing is to be permitted in current art systems, the programmer is forced to accept the overhead imposed by the operating system in managing multithreading. However, much of the overhead—the time spent by the operating system in saving the context of the thread being switched out before switching to the thread receiving the next time slice—may not be necessary in many real-life, real-time applications. The time spent in context switching can be significant. For example, in certain current operating systems (e.g., Operating System/2 2.0 manufactured by the IBM Corp.), context switching takes on the order of 500 microseconds or more. For a time slice of 30 milliseconds, that overhead represents 1.67% of each time slice which may not seem significant until it is pointed out that context switching activity takes roughly one half of a time slice each second. Therefore, for applications requiring time slices on the order of 10 milliseconds or less, overhead becomes more excessive.

This invention makes the overhead negligible by providing a new operating system commands and constructs which take advantage of the user's intimate knowledge of an application, and provides greater control over the operating system environment to synchronize time-sensitive activities. These commands are described as follows and, although the approach is particularly applicable to assembly language code, it can also be implemented in compilers for higher level languages.

This invention is based on the concept of "threadlets". For the purpose of this invention, a threadlet is a region within a thread or process that has critical interaction requirements that cannot be met as parts of separate threads or processes because operating system time slicing support cannot be achieved. The user defines the threadlets through knowledge of an application and its corresponding operational requirements. The beginning and end of a threadlet are identified to the operating system through the "Begin Threadlet" and the "End Threadlet" statements. Implementation of threadlets requires the use of a segmented stack, each segment to hold, separately, that part of the stack belonging to each threadlet. When the invention is implemented in assembly language code, the user must know locations within each threadlet where the data contents of the registers, following execution of a particular instruction, do not merit saving or that the data contents which would be saved during a thread context switch, already happen to be saved in memory. This situation provides the user an opportunity to switch to a different activity without saving registers. The user identifies this to the Operating System (OS) by a special instruction: "SWITCHIR". The SWITCHIR instruction, symbolic for "Switch if required", is an OS call which tells the OS not to save registers. Within the same thread, the OS will keep on executing a threadlet until it encounters a SWITCHIR instruction. Upon encountering the SWITCHIR instruction, the OS will save the program counter (PC) and the stack pointer (SP) in a "Threadlet Control Block" (TCB). This concept is analogous to the current art thread control block. The OS will switch to the PC and SP of the stack segment for the next threadlet and start executing with that PC. Note that switching to a new PC and SP takes only 2 to 3 microseconds or less in MODERN 32-bit microprocessors. If an equality strategy is employed, the OS will execute the code for each threadlet in round-robin fashion, switching to the next threadlet as it reaches a "SWITCHIR" or and "END THREADLET" instruction, but performing regular thread or process switching when the thread's time slice has expired or an interrupt occurs. One skilled in the art will appreciate that the operating system need not always perform a switch when the "SWITCHIR" instruction is encountered, it merely indicates that it may do so if desired. If a high-priority strategy is employed, the OS will execute the code for each threadlet in round-robin fashion, checking a timer as it reaches each SWITCHIR instruction. If the timer time has expired, the OS immediately begins execution of the high-priority threadlet, and, upon completion of its execution, resumes round-robin execution of the thread's threadlets where it left off. Table A presents an example of the operation of the invention within an application program.

TABLE A

Begin threadlet 1
...
SwitchIR
SwitchIR
...
SwitchIR
End threadlet 1
...
...
...
Begin threadlet n
...
SwitchIR
...
SwitchIR
...
SwitchIR
End threadlet n As shown in Table A, the presence of the "BEGIN THREADLET 1" instruction indicates to the Operating System (OS) the beginning of a threadlet. The OS will dispense with saving the data contents of its registers when the SWITCHIR instruction is encountered within the program. The "END THREADLET" instruction indicates to the OS the end of a threadlet. This invention thus allows the user to achieve the effect of multithreading, multitasking with very small slices with the time slices as small as desired.

Turning now to FIG. 1, a flow diagram of the invention is shown for creating code for an application where multiple subprocesses need to be closely synchronized within time intervals much smaller than a time slice. Each subprocess is incrementally executed in unison with each of the others. The procedure starts at Block 10 and moves to Block 12 where a time slice is obtained from the OS to process a thread. At Block 14 the procedure issues the command to load the threadlet control block (e.g., counters, strategy, threadlet entry addresses, timer). It should be emphasized that the strategy variable within the threadlet control block identifies whether threadlets are to be peers or whether one of then will get special treatment. The procedure proceeds to Block 16 where the Program Counter (PC) and Stack Pointer (SP) are loaded for the Threadlet counter, "i". "Threadlet i" is executed until the next SWITCHIR is encountered as shown in Block 18. Processing proceeds to Block 20 where the Program Counter (PC) and Stack Pointer (SP) are saved for Threadlet i. The strategy is checked at Block 22 to determine if the equality strategy is in effect, i.e. all threadlets are to receive equal priority. If the strategy is not the equality strategy, a check is conducted at Block 28 to determine if the priority criteria is met. If NO, processing proceeds to Block 24. If YES, the procedure proceeds to Block 30 where the operating system executes the most favored threadlet and then proceeds to Block 32 where the Threadlet counter, i, is incremented before returning to Block 16. Returning to Block 22, if the equality strategy check is YES, at Block 24, a check is conducted to see if time is up for the time slice. If NO, the threadlet counter, i, is incremented at Block 32 and processing proceeds to Block 16. Returning to Block 24, if the time slice is up, the procedure saves the thread's context, including the threadlet control block, at Block 26 and the procedure stops until it gets the next time slice.

The use of the invention in a real-time application will now be shown. Suppose a user needs to create code for a multimedia project where two data streams, one for sound and one for video, are to be processed synchronously. The sound output must be presented to the user with fidelity, and at the same time, the full motion video output that accompanies the sound output must be presented without jerkiness. Processing the sound data stream requires that its digital signal be transformed into signals that will drive an analog device, a speaker, to produce sound waves. Processing the video data stream requires its digital signal be transformed into bit maps or frames that will be presented on a display screen. It is appreciated by one skilled in the art that processing the sound data stream is much less complex and time consuming for a given presentation time increment then the processing of the video data stream. For example, using a high speed processor, the sound portion of the code may process one second of output sound in approximately 500 microseconds. On the other hand, one video frame of the accompanying video portion may be processed by the high speed processor in approximately 10 milliseconds.

It should be understood that presentation of both sound and video is time critical to ensure fidelity. The code must be able to make CPU time available on a regular basis to perform the presentation. Presentation of sound involves sending a processed data stream to a device that paces the presentation depending on the content of the data stream which may take only 50 microseconds for one second of output sound. Presentation of a bitmap, once it has been processed into video memory, may take only 100 microseconds. For full-motion video, a frame must be displayed at 30 millisecond intervals. Therefore, the processing work must be interrupted at regular intervals to ensure the presentation work is done. Thus, portions of the code dealing with presentation are time-critical, while the bulk of the code will be concerned with processing the two data streams. In such a case, the use of the present invention will provide the user with very fine control over synchronization of these two activities as shown in the following description.

Figure 2:
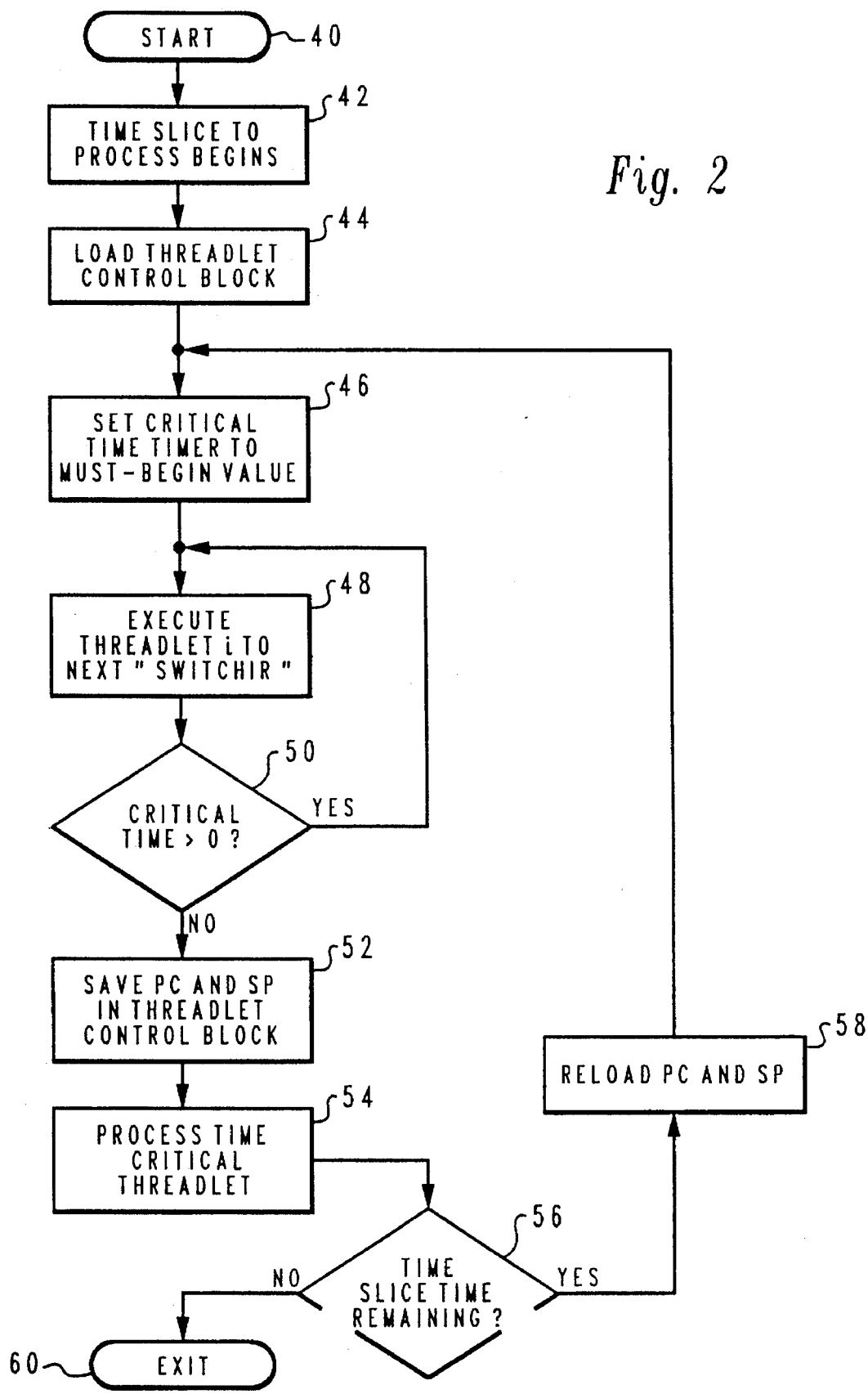
FIG. 2 depicts a flowchart of the invention for processing a multimedia presentation.

Turning now to the figures, and more particularly FIG. 2, a flow diagram is shown for controlling a multimedia presentation using the invention. At Block 42, the procedure obtains a time slice to process the multimedia presentation. The causes the OS to load the threadlet control block as shown in Block 44. One skilled in the art will appreciate that the threadlet control block identifies the number of threadlets, the entry point addresses, the time-critical threadlets and the critical time value. At Block 46, the critical time timer is set to its must-begin value and the threadlet counter, i, is set to one. Execution of threadlet i begins and continues to the next SWITCHIR instruction as shown in Block 48. At this point, the critical time timer is checked to determine if it has a value greater then zero as shown in Block 50. If YES, the procedure returns to Block 48. Else, the procedure saves the Program Counter (PC) and Stack Pointer (SP) in the threadlet control block in Block 52 and execution of the time-critical threadlet is executed at Block 54. At Block 56, the procedure checks to see if any time slice time remains. If YES, the PC and SP are reloaded at Block 58 and the procedure returns to Block 46 to process additional threadlets beginning after the "SWITCHIR" that allowed the cheap switch. Else, the process context is saved and the OS begins execution of other processes. A sample of the pseudo-code for processing the Multimedia sound and video is shown in Table B.

TABLE B

Begin threadlet 1 {for processing the video and
　　　　　　　　　　sound data streams}
　　loop
　　　　. . .
　　　　if in danger of overrunning buffer wait
　　　　SwitchIR
　　　　process video data stream into sound buffers
　　　　. . .
　　　　SwitchIR
　　　　. . .
　　　　if in danger of overrunning buffer wait
　　　　SwitchIR
　　　　process sound data stream into video buffers
　　　　. . .
　　　　SwitchIR
　　　　if in danger of overrunning buffers wait
　　　　SwitchIR
　　end loop
　　End threadlet 1
　　Begin threadlet 2 {for presentation of video and sound}
　　　　. . .
　　　　present video
　　　　. . .
　　　　present sound
　　End threadlet 2

As indicated in Table B, the beginning of the Multimedia threadlet is indicated by the BEGIN THREADLET1 instruction. Various instructions within the code are executed until the first SWITCHIR is encountered. The Operating System then saves the Program Counter (PC) and Stack Pointer (SP) of the first threadlet and moves to the second threadlet which processes the video data stream into video buffers. The procedure continues to process the application code by saving the PC and SP each time a SWITCHIR instruction is encountered until the END THREADLET1 instruction is encountered.

Figure 3:
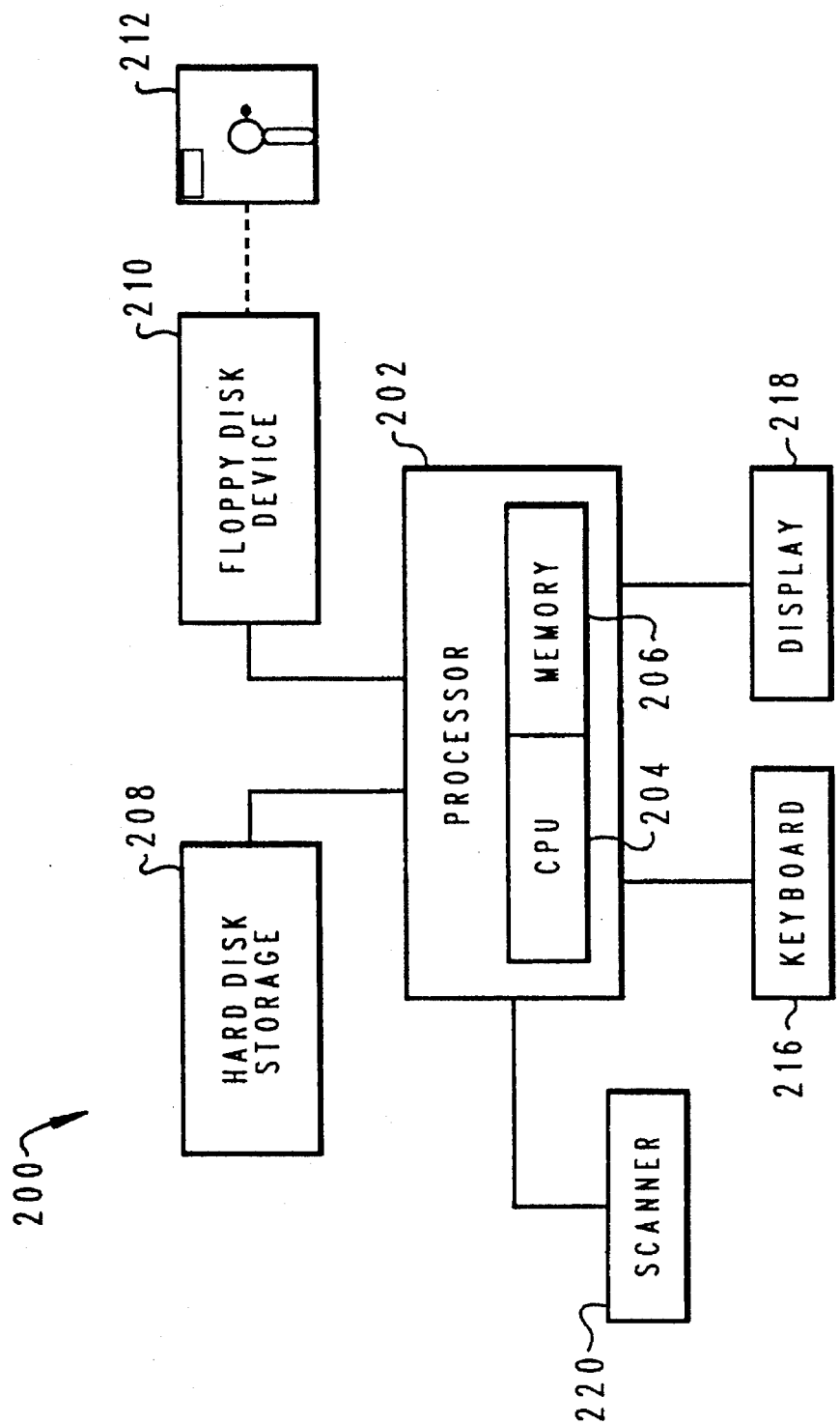
FIG. 3 shows a data processing system where operation of the present invention is carried out.

Turning now to FIG. 3, a data processing system, 200, is shown where the operation of the present invention is carried out. The data processing system, 200, consists of a processor, 202, containing a CPU, 204, and memory, 206. Attached to the processor, 202, is a scanner, 220, for inputting information into the data processing system, 200. In addition, a keyboard, 216, is provided for entry of data by a user. Permanent storage is provided by hard disk storage, 208, along with removable storage in the form of a floppy disk device, 210. Program information or data may be inputted to the system by a floppy disk, 212. A display device, 218, is also provided to permit a user to view information and data processing within the data processing system.

While the invention has been particularly shown and described with reference to preferred embodiments thereof, it will be understood by those skilled in the art that various changes in form and details may be made therein without departing from the spirit and scope of the invention.

What we claim is:

1. A method, implemented in a data processing system, of subdividing processing cycles of a thread among a set of threadlets within an application program, comprising:

obtaining a first time slice for said thread having a fixed execution time within said data processing system, indicating to said data processing system the beginning and ending of said threadlets in said application program whose processing cycles will be subdivided among said set of threads, loading said data processing system with a threadlet control block of said thread containing said set of threadlets within said application program, and executing said set of threadlets for said threadlet control block in the order specified and within the fixed execution time of said time slice.

2. The method of claim 1 wherein the step of executing said set of threadlets includes detecting a switch instruction indicating that the program counter and stack pointer are to be saved.

3. The method of claim 1 wherein the step of executing said set of threadlets includes the loading a program counter and stack pointer for said set of threadlets.

4. The method of claim 1 wherein the step of indicating the beginning of said threadlet is by a BEGIN THREADLET instruction in said application program.

5. The method of claim 1 wherein the step of indicating the ending of said threadlet is by a END THREADLET instruction in said application program.

6. A method, implemented in a data processing system, of reducing the overhead for context switching for a threadlet having a fixed execution time by an operating system in said data processing system, comprising:

defining the start of said first threadlet by a begin instruction within application code in said data processing system; and defining the location where data contents that would be saved in a threadlet context switch do not merit saving, and where only the program counter and stack point require saving in order to resume threadlet execution by said data processing system; and defining a threadlet switch instruction construct to identify where said threadlet context switch can occur at low cost: and executing said first threadlet by said operating system until a switch instruction is encountered within said application code and thereupon saving the program counter and stack pointer for said first threadlet and executing a second threadlet specified by a threadlet control block.

7. The method of claim 6 wherein said step of executing said first threadlet includes saving said program counter and stack pointer into said data processing system when said switch instruction is encountered in said application code.

8. The method of claim 6 wherein said step of executing said second threadlet includes loading a program counter and stack pointer for said second threadlet for a stack segment different from that for said first threadlet.

9. The method of claim 6 wherein said step of executing said second threadlet includes saving the program counter and stack pointer for said second threadlet for a stack segment, separate from that for said first threadlet, when a second switch instruction is encountered in said application code.

10. An apparatus in a data processing system for subdividing processing cycles of a thread among a set of threadlets within an application program, comprising:

means for indicating to said data processing system a beginning and ending of said set of threadlet in said application program whose processing cycles will be subdivided among said set of threads, means for loading said data processing system with a threadlet control block of said thread containing said set of threadlets within said application program, and means for executing said set of threadlets within said threadlet control block in the order specified and within a fixed execution time of said thread.

11. The apparatus of claim 1 wherein the means for executing said set of threadlets includes means for detecting a switch instruction indicating that a program counter and stack pointer for said threadlet are to be saved.

12. The apparatus of claim 1 wherein the means for executing said set of threadlets includes means for loading a program counter and stack pointer for said set of threadlets from a stack different from said thread.

13. The apparatus of claim 1 wherein the means for indicating the beginning of said threadlet is by a BEGIN THREADLET instruction in said application program.

14. The apparatus of claim 1 wherein the means for indicating the ending of said threadlet is by a END THREADLET instruction in said application program.

* * * * *